US009923413B2

(12) United States Patent
Gamborg

(10) Patent No.: US 9,923,413 B2
(45) Date of Patent: Mar. 20, 2018

(54) LINE BALANCING UPS

(75) Inventor: Gorm Gamborg, Kolding (DK)

(73) Assignee: SCHNEIDER ELECTRIC IT CORPORATION, West Kingston, RI (US)

(*) Notice: Subject to any disclaimer, the term of this patent is extended or adjusted under 35 U.S.C. 154(b) by 983 days.

(21) Appl. No.: 14/357,281

(22) PCT Filed: Nov. 11, 2011

(86) PCT No.: PCT/US2011/060358
§ 371 (c)(1),
(2), (4) Date: Sep. 16, 2014

(87) PCT Pub. No.: WO2013/070237
PCT Pub. Date: May 16, 2013

(65) Prior Publication Data
US 2015/0084423 A1  Mar. 26, 2015

(51) Int. Cl.
H02J 9/00       (2006.01)
H02J 9/06       (2006.01)
H02J 3/26       (2006.01)

(52) U.S. Cl.
CPC ........ *H02J 9/06* (2013.01); *H02J 3/26* (2013.01); *H02J 9/062* (2013.01); *Y02E 40/50* (2013.01); *Y10T 307/615* (2015.04)

(58) Field of Classification Search
USPC .......................................................... 307/64
See application file for complete search history.

(56) References Cited

U.S. PATENT DOCUMENTS

| 4,665,322 A | 5/1987 | Eishima et al. |
| 2007/0005192 A1 | 1/2007 | Schoettle et al. |
| 2012/0029720 A1* | 2/2012 | Cherian ............ H02J 13/00 700/297 |

FOREIGN PATENT DOCUMENTS

| CN | 101199093 A | 6/2008 |
| EP | 2026440 A2 | 2/2009 |
| JP | 2006 271080 A | 10/2006 |

OTHER PUBLICATIONS

Australian Patent Examination Report from corresponding Australian Patent Application No. 2011380914 dated Apr. 12, 2016.

(Continued)

*Primary Examiner* — Rexford Barnie
*Assistant Examiner* — Dru Parries
(74) *Attorney, Agent, or Firm* — Lando & Anastasi, LLP

(57) ABSTRACT

A method for controlling an uninterruptible power supply (UPS) having a polyphase power input and an input power circuit coupled to the polyphase power input includes determining to reduce a load on a first phase of the polyphase power input, and in response thereto, controlling the input power circuit to reduce a first input current drawn from the first phase by a first amount and increase a second input current drawn from a second phase of the polyphase power input by a second amount. The UPS may determine to reduce the load on the first phase in response to a request from a smart grid to reduce the load on the first phase or in response to a local determination to reduce the load on the first phase.

20 Claims, 4 Drawing Sheets

(56) References Cited

OTHER PUBLICATIONS

Casadei, D. et al. "Power Quality Improvement and Uninterruptible Power Supply Using a Power Conditioning System with Energy Storage Capability," Department of Electrical Engineering, University of Bologna, Power Tech, 2005 IEEE Jun. 30, 2005, pp. 7.

Escobar G et al: "Repetitive-Based Controller for a UPS Inverter to Compensate Unbalance and Harmonic Distortion", IEEE Transactions on Industrial Electronics, IEEE Service Center, Piscataway, NJ, USA, vol. 54, No. 1, Feb. 1, 2007 (Feb. 1, 2007), pp. 504-510, XP011163584, ISSN: 0278-0046. DOI: 10.1109/TIE.2006.888803 paragraph [00IV]; figures 1, 2, 5.

International Search Report from corresponding PCT/US2011/060358 dated Aug. 17, 2012.

\* cited by examiner

LINE BALANCING UPS

This application is a National Stage Application under 35 U.S.C. § 371 from PCT/US2011/060358 entitled "LINE BALANCING UPS," filed on Nov. 11, 2011, which is herein incorporated by reference in its entirety.

BACKGROUND OF THE INVENTION

1. Field of Invention

Embodiments of the invention relate generally to power management, and more particularly, to dynamic load adjustment per phase of a polyphase uninterruptible power supply.

2. Discussion of Related Art

An uninterruptible power supply (UPS) is used to provide backup power to an electrical device, or load, while the primary power source, or mains, is unavailable. A conventional UPS rectifies input power provided by an electric utility using a power factor correction circuit (PFC) to provide a DC voltage to a DC bus. The rectified DC voltage is typically used to charge a battery while mains power is available, as well as to provide power to the DC bus. In the absence of mains power, the battery provides power to the DC bus. From the DC bus, an inverter generates an AC output voltage to the load. Since the DC bus is always powered either by mains or the battery, the output power of the UPS is uninterrupted if the mains fails and the battery is sufficiently charged.

While uninterruptible power supplies are typically used to provide a continuous source of power at a local level (e.g., at a data center or in an office or home), such devices primarily depend on utility power due to the limited capacity of the batteries or other energy storage devices used in conjunction with the UPS. Historically, electric utility service has been demand-driven and inefficient, but increasingly technology is being employed to improve the availability, reliability and efficiency of the electric grid. Commonly, these improved electric grids are called "smart grids."

A "smart grid," as described by the Institute of Electrical and Electronics Engineers (IEEE) of New York, N.Y., includes "a next-generation electrical power system that is typified by the increased use of communications and information technology in the generation, delivery and consumption of electrical energy." As of 2011, a smart grid is considered an overarching and evolving concept that is not limited to any particular technological features, and may also include standards, goals, objectives, and procedures that collectively support the development, implementation, and efficient delivery of reliable, affordable, and sustainable electricity services. Accordingly, no standard definition of smart grid presently exists; rather, the term refers broadly to various interrelated power generation, distribution, and consumption concepts. Some existing electrical power systems presently incorporate one or more elements that may be characterized as forming portions of a smart grid system rather than the whole.

Among other goals, one objective of a smart grid is to intelligently match power generation with power consumption. Historically, electric utilities have relied on total load averages, which are relatively stable and can be computed ahead of time, to anticipate power demands based on reasonable expectations of consumer requirements. The total load average is used to determine a baseload or minimum amount of power that a utility needs to make available without risking an interruption of service.

However, the total load connected to a power grid can vary significantly over time; for example, commercial power usage is typically higher during daytime than at night, residential power usage is highest during the early morning and evening hours, and loads also increase during periods where heating or cooling demands are greatest. Therefore, by using a total load average, the baseload (and any additional power generation kept in contingency) may be higher than necessary to support loads that fluctuate in real-time. Accordingly, highly reliable power delivery is achieved at the expense of wasted power that is generated in excess of demand. Furthermore, there may be times when the load increases substantially above the baseload capacity of the power utility with little or no warning, which introduces additional reliability and efficiency costs. Accordingly, one objective of a smart grid, generally, is to reactively and/or proactively adjust the baseload (e.g., increase or decrease supply to meet demand) and/or the total load (e.g., increase or decrease demand to meet supply) to optimally match the amount of power generated with the amount of power consumed (demanded) at any given moment. Today many power distributors attempt to match the power generated with the power consumed by stepping up or stepping down individual phases in the power distribution transformers (away from the power consumers); however, this only helps in outbalancing any unbalance in the line voltage and does not balance the grid load nor help reduce the unwanted losses in the distribution lines caused by the unbalance in the grid current. Therefore, it can be difficult to accomplish the power management objectives of the smart grid without some degree of cooperation between the electric utility and power consumers.

SUMMARY OF THE INVENTION

According to one embodiment, a method for controlling an uninterruptible power supply (UPS) having a polyphase power input and an input power circuit coupled to the polyphase power input includes determining to reduce a load on a first phase of the polyphase power input, and in response thereto, controlling the input power circuit to reduce a first input current drawn from the first phase by a first amount and increase a second input current drawn from a second phase of the polyphase power input by a second amount. In one embodiment, the UPS may determine to reduce the load on the first phase in response to a request from a smart grid to reduce the load on the first phase. In another embodiment, the UPS may determine to reduce the load on the first phase in response to a local determination to reduce the load on the first phase.

In another embodiment, the method may include calculating the first amount to reduce the first input current and the second amount to increase the at least one second input current such that a total output current of the UPS remains substantially constant as the first input current is reduced. In yet another embodiment, the input power circuit may be configured to drive the first input current toward a first current reference value and drive the at least one second input current toward at least one second current reference value. The method may further include an act of generating the first current reference value so as to reduce the first input current by the first amount and the at least one second current reference value so as to increase the at least one second input current by the second amount.

In another embodiment, the act of generating may include generating the first current reference signal and the at least one second current reference signal such that each is substantially sinusoidal and in-phase with the first phase of the polyphase power input and the at least one second phase of the polyphase power input, respectively.

In another embodiment, the UPS may have a communication interface configured to receive a message from a smart grid including a request to reduce the load on the first phase. The method may further include receiving the communication using the message interface, wherein the act of determining is performed in response to receiving the request. In yet another embodiment, the message may be a first message, and the smart grid message interface may be further configured to send a second message including an acceptance of the request to the smart grid. The method may further include sending the second message using the smart grid message interface in response to determining to reduce the load on the first phase of the polyphase power input.

In another embodiment, the UPS may have a total rated output power. The input power circuit may be further configured to provide a total demanded output power to a load of the UPS. The method may further include comparing the total demanded output power to the total rated output power, and the act of determining may include determining to reduce the load on the first phase when the total demanded output power is less than a predetermined amount of the total rated output power.

In another embodiment, the load on the first phase may be a first load. The method may further include detecting that the first load is greater than at least one second load on at least one second phase, and the act of determining may include determining to reduce the first load in response to detecting that the first load is greater than the at least one second load by a predetermined amount.

In one embodiment, an uninterruptible power supply (UPS) includes a polyphase power input having a first phase and a second phase, an input power circuit coupled to the polyphase power input and configured to draw a first input current on the first phase and draw a second current on the second phase, and a control unit coupled to the input power circuit. The control unit is configured to determine to reduce a load on the first phase, and in response thereto, control the input power circuit to reduce the first input current and increase the second input current.

In another embodiment, the control unit may be further configured to calculate the first amount to reduce the first input current and the second amount to increase the second input current such that a total output current of the UPS remains substantially unchanged as the first input current is reduced. In yet another embodiment, the input power circuit may be configured to drive the first input current toward a first current reference value and drive the second input current toward a second current reference value. The control unit may be further configured to generate the first current reference value so as to reduce the first input current by the first amount and the second current reference value so as to increase the second input current by the second amount.

In another embodiment, the control unit may be further configured to generate the first current reference signal and the second current reference signal such that each is substantially sinusoidal and in-phase with the first phase of the polyphase power input and the second phase of the polyphase power input, respectively.

In another embodiment, the UPS may further include a communication interface coupled to the control unit. The communication interface may be configured to receive a message from a smart grid. The message may include a request to reduce the load on the first phase. The control unit may be further configured to receive the message using the communication interface and determine to reduce the load on the first phase in response to receiving the request in the message.

In another embodiment, the UPS may further include an input rectifying stage coupled to the polyphase power input. The input rectifying stage may be configured to adjust a first RMS current drawn from the first phase and a second RMS current drawn from the second phase to be either similar or dissimilar in response to receiving the request. In yet another embodiment, a total average power drawn by the UPS from the first phase and the second phase may be substantially the same subsequent to adjusting the first RMS current and the second RMS current as prior to adjusting the first RMS current and the second RMS current.

In another embodiment, the UPS may have a total rated output power. The input power circuit may be further configured to provide a total demanded output power to a load of the UPS. The control unit may be further configured to compare the total demanded output power to the total rated output power and determine to reduce the load on the first phase when the total demanded output power is less than a predetermined amount of the total rated output power.

In another embodiment, the load on the first phase may be a first load. The control unit may be further configured to detect that the first load is greater than a second load on the second phase and determine to reduce the first load in response to detecting that the first load is greater than the second load by a predetermined amount.

In one embodiment, an uninterruptible power supply (UPS) includes a polyphase power input having a first phase and a second phase, a rectifier circuit coupled to the polyphase power input and configured to draw a first input current on the first phase and draw a second current on the second phase, and means coupled to the rectifier circuit for determining to reduce a load on the first phase, and reducing the load on the first phase in response thereto. In another embodiment, the UPS may be configured to provide an output power. The UPS may further include means for maintaining the output power at a substantially unchanged level as the load on the first phase is reduced.

In another embodiment, the UPS may further include a communication interface configured to receive a message from a smart grid. The message may include a request to reduce the load on the first phase. The means for determining to reduce the load on the first phase may be coupled to the communication interface and may be configured determine to reduce the load on the first phase in response to receiving the request in the message.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF THE INVENTION

Figure 1:
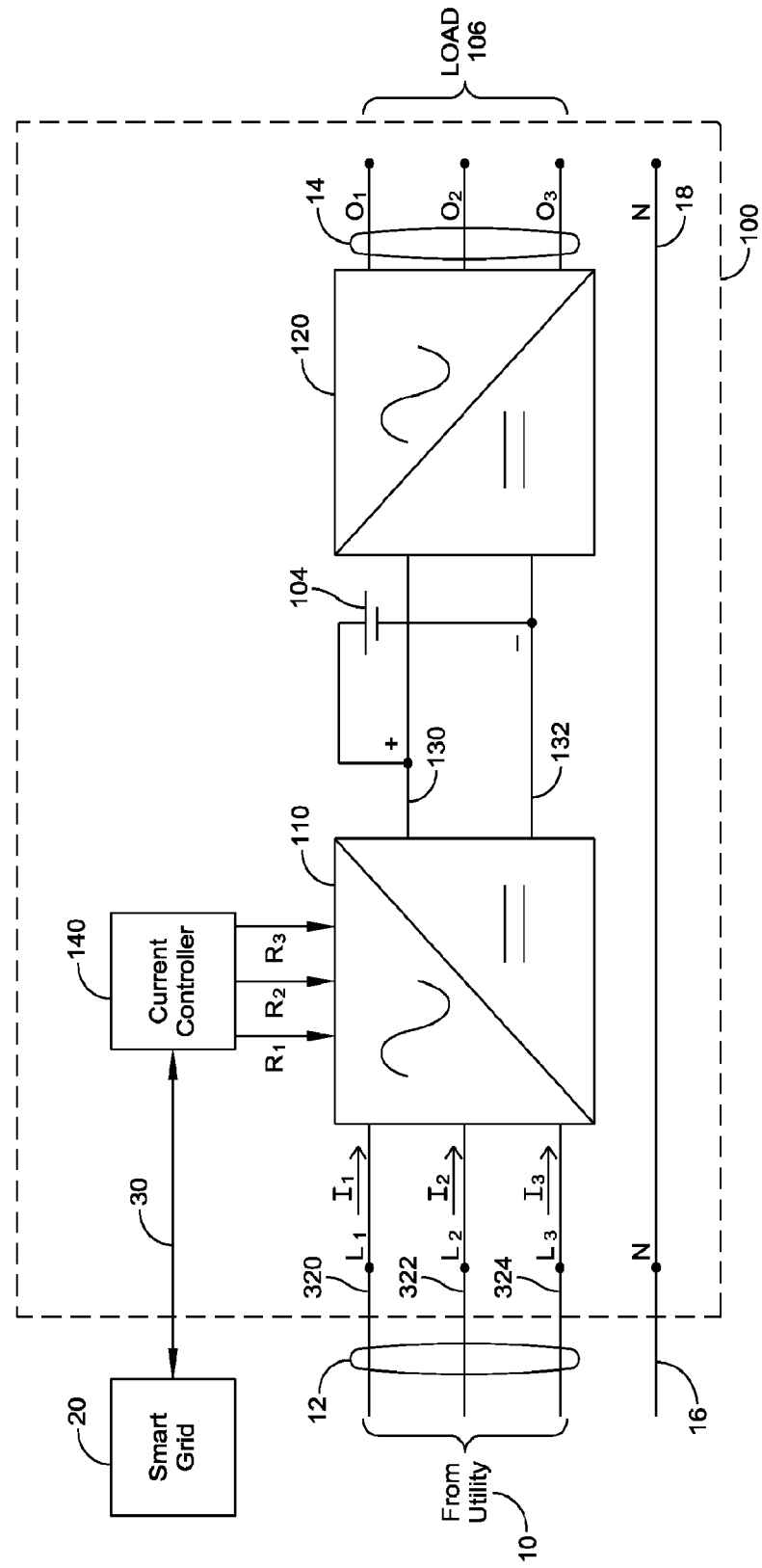
FIG. 1 is a block diagram of an uninterruptible power supply in accordance with one embodiment of the present invention.

Embodiments of this invention are not limited in their application to the details of construction and the arrangement of components set forth in the following description or illustrated in the drawings. Embodiments of the invention are capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Various embodiments relate to power conversion in a UPS, including polyphase power distribution to a load (e.g., three phase power). As used herein, the term "polyphase" means two or more phases. Although the use of three-phase power is common, it should be appreciated that, in some embodiments, the UPS may be a two-phase, four-phase or other polyphase power device. Furthermore, the number of input and output phases may not be equal. For example, the UPS may have a three-phase input and a one-phase output. Embodiments of the invention are not limited for use in uninterruptible power supplies and may be used with other power supplies or other power systems generally.

As discussed above, because the total load connected to the power grid can vary significantly, including UPS loads, there may be times during which loads on the grid are unbalanced. According to some embodiments, it is appreciated that unequal loads among different phases can lead to higher power losses, in particular, because the loss in an electrical wire is proportional to the square of the current ($R*I^2$). For example, if the current in each phase is 2 amps, the loss is proportional to $2^2+2^2+2^2=12$. However, if the currents are instead 1, 2 and 3 amps respectively in all three phases, the loss is proportional to $1^2+2^2+3^2=14$. Furthermore, an unequal load can result in an additional loss in the neutral line. In addition to this, an unbalanced grid will have an unbalance in the line voltage, which is also undesired. One example in which an unbalance in the grid voltage is particularly undesirable is if the load on the grid is primarily an electronic load, since an electronic load typically is a constant power load. In contradistinction from a resistive load, a constant power load will draw higher current if the voltage drops. This will add a highly undesired self-perpetuating unbalance in the load. Therefore, it is desirable to outbalance the unequal loads to restore balance on the power distribution grid.

According to one aspect of the invention, a polyphase UPS is configured to outbalance unequal loads, such as described above, by selectively reducing a load on at least one phase of a polyphase power input. Reducing the load on one phase may, for example, enable the power distribution grid to achieve balance. In one embodiment, the UPS outbalances unequal loads by drawing unequal currents from each of the input phases. The decision whether to selectively reduce the load on one or more of the input phases can be made either independently (e.g., by a control unit in the UPS) or in response to a remote command (e.g., a message from a smart grid power distributor including a request to reduce the load on one or more input phases). For example, if one phase of the input power supply is overloaded or unbalanced in one region of a city or other power distribution region, the smart grid distributor may request that the UPS (as well as possibly other power consumers) reduce, at least temporarily, the load drawn by the UPS from the overloaded or unbalanced phase. If reducing the load on one phase will not cause the other phases to become overloaded or the UPS to exceed the maximum load rating for any phase, the UPS can reduce the load on the overloaded phase in response to the request from the smart grid distributor. For instance, if the total power output of the UPS is at or below approximately 66% of the total rated power of the UPS, it may be possible to reduce or remove the load on one phase and operate the UPS on the other phases either alone or in combination with the phase on which the load is reduced. To compensate for the reduced load on one phase, the load or loads on the other phases can be increased so that the total power output of the UPS is substantially unchanged.

In one embodiment, the load on one input phase can be reduced by reducing the amount of current drawn on the respective input phase. A corresponding increase of the load on the other input phases is achieved by increasing the amount of current drawn from those input phases. The current on each input phase can be controlled using separate current reference signals for each phase of the power input. The current reference signals may, for example, be generated by a control unit coupled to or contained within the UPS, and more particularly, a current controller coupled to an input power circuit such as a power factor correction (PFC) circuit or controllable rectifier. The PFC circuit receives input power (e.g., utility power) and is configured to drive each of the input currents toward the respective current reference signals. For instance, the PFC circuit may drive each input current to substantially match a corresponding current reference value (e.g., a magnitude of the current reference). Therefore, in one embodiment, unequal currents can be drawn from each of the input phases by adjusting (e.g., reducing or increasing) one or more of the current reference signals corresponding to each phase.

FIG. 1 is a block diagram of a UPS 100 according to one embodiment. The UPS 100 can be a polyphase UPS, for example, a three-phase UPS. In this embodiment, the UPS 100 is configured to receive three-phase AC input power 12 from a utility 10, and supply three-phase AC output power 14 to a load 106. The UPS 100 further includes a neutral input 16 and a neutral output 18. The neutral input 16 may be coupled to the neutral output 18 to provide a continuous neutral path through the UPS 100. An optional communication channel 30 couples the UPS 100 with one or more smart grid power distributors 20.

The UPS 100 provides regulated power to the load 106 from either the utility AC power source 10 or a backup power source, such as a battery 104. The UPS 100 includes a power factor correction (PFC) circuit 110, an inverter 120, and a current controller 140 for controlling the PFC circuit and the inverter. In some embodiments, the PFC circuit 110 includes a rectifier/boost converter for converting the polyphase AC input power into DC power.

In line mode of operation, under control of the current controller 140, the PFC circuit 110 converts the input AC voltage 12 on each input phase into positive and negative DC voltages at a positive DC bus 130 and a negative DC bus 132, respectively. The UPS 100, in some embodiments, includes a battery charging circuit (not shown) for charging the battery 104 during the line mode of operation. In backup mode of operation (also called battery mode of operation), upon loss of input AC power 12 the PFC circuit 110 is not able to generate the DC voltage, since no supply power is available. In both line and backup modes of operation, the inverter 120 receives the positive DC voltage 130 and the negative DC voltage 132 from the rectifier/boost converter 110 or from the battery during backup mode. The inverter 120 converts the positive and negative DC voltages into an output AC voltage at the single- or polyphase power output lines 14 (e.g., three phase).

As discussed above, in one embodiment, the UPS 100 is configured to selectively reduce a load on at least one input phase. The current controller 140 may be included in another control unit, or the current controller 140 may be a separate controller or other means for controlling the UPS 100 (e.g., a device for determining to reduce a load on the first phase). For example, the current controller 140 may be implemented in firmware in a microprocessor, digital signal processor, field-programmable gate array, or alternatively, the current controller may be made by analog electronic circuits. The current controller 140 is configured to generate a plurality of current reference signals each corresponding to one phase of the polyphase line input 12. For instance, in a three-phase system, three current reference signals $X_1$, $X_2$ and $X_3$ are generated by the current controller 140. The three current reference signals $X_1$, $X_2$ and $X_3$ correspond to input currents $I_1$, $I_2$ and $I_3$ on the three input phases 320, 322 and 324, respectively.

In one embodiment, the PFC circuit 110 is configured to drive input currents $I_1$, $I_2$ and $I_3$, which are the input currents on the three input phases 320, 322 and 324, respectively, toward the corresponding current reference signals $X_1$, $X_2$ and $X_3$. The load on one or more of the input phases 320, 322 and 324 can be reduced by drawing an unequal current from each of the input phases. Therefore, the load can be reduced by adjusting (e.g., reducing) the current reference corresponding to each phase for which the load is to be reduced. Further, the load can be increased on the other input phases by adjusting (e.g., increasing) the current reference(s) corresponding to each phase for which the load is to be increased.

Figure 2A:
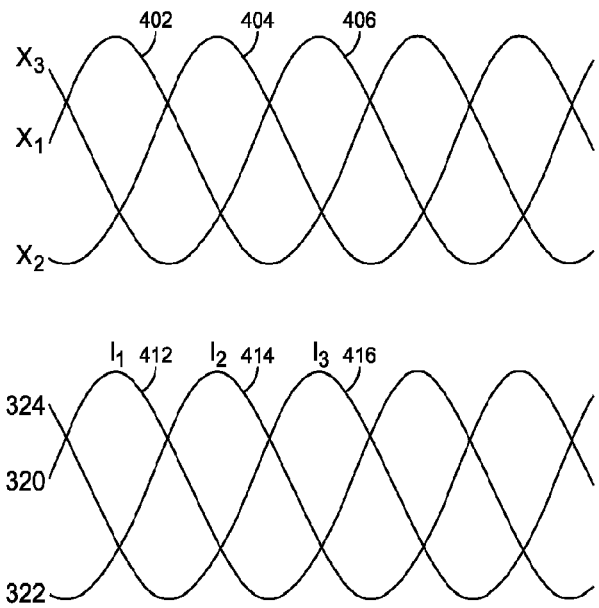
FIGS. 2A and 2B are graphs of several exemplary current reference waveforms and UPS input current waveforms in accordance with one embodiment of the present invention.

As discussed above, in one embodiment the PFC circuit 110 is configured to drive input currents $I_1$, $I_2$ and $I_3$ toward the corresponding current references $X_1$, $X_2$ and $X_3$. FIG. 2A shows an example of current reference waveforms 402, 404 and 406 that can be generated by the current controller 140 of FIG. 1 and associated with current reference signals $X_1$, $X_2$ and $X_3$. In this example, all of the current reference waveforms 402, 404 and 406 are substantially sinusoidal and in-phase with a respective phase of the polyphase line input 12. The current reference waveforms 402, 404 and 406 may have substantially similar magnitudes (e.g., as shown in FIG. 2A), although, as described below, each current reference waveform may, from time to time, have unequal magnitudes. Since the PFC circuit 110 is configured to drive the input currents toward the current reference signals $X_1$, $X_2$ and $X_3$, the corresponding input currents $I_1$, $I_2$ and $I_3$, which are indicated by the waveforms 412, 414 and 416, respectively, closely follow the current reference waveforms 402, 404 and 406. The UPS 100 may normally operate in this manner to draw substantially equal currents from each phase of the polyphase power input 12.

Figure 2B:
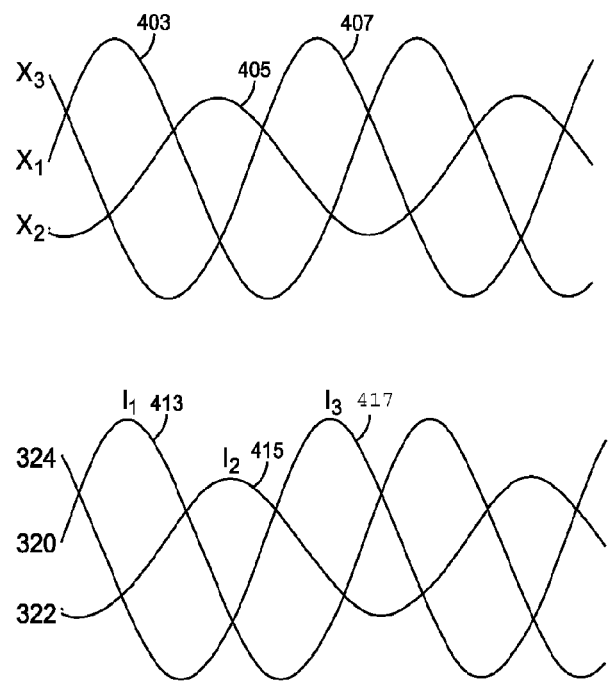

However, as discussed above, the UPS 100 is further configured to selectively draw unequal loads from each phase of the polyphase power input 12. FIG. 2B shows, in another example, that the current reference signals $X_1$, $X_2$ and $X_3$ have been adjusted by the current controller 140 to reduce the load on, in this case, the second phase. Specifically, the load on the second phase is reduced by reducing the input current $I_2$, which can be achieved by reducing the corresponding current reference $X_2$, shown by line 405. If the total output load (demanded power) is less than a predetermined percentage of the total rated load (or maximum rated load) of the UPS 100, the current $I_2$ on the second phase 322 can be reduced to zero because the remaining phases 320 and 324 have sufficient capacity to power the load 106. The predetermined percentage is, in one embodiment, a function of the design capacity of the UPS 100 and/or the load 106 (e.g., depending on the real or apparent power to the load).

When the load on one phase of the polyphase power input 12 is reduced, the UPS 100 is configured to compensate by increasing the load on one or more other phases of the polyphase power input 12. Increasing the load on one other phase or loads on several other phases enables the UPS 100 to maintain a substantially unchanged total power output level to the load 106 as the load on one phase is reduced. In one example, shown in FIG. 2B, the current reference signals $X_1$ and $X_3$ corresponding to the phases for which the load is not reduced (phases 320 and 324) may be increased to maintain a substantially constant total output power of the UPS 100. It should be appreciated that the load on any phase of the polyphase power input 12 can be similarly reduced or increased by making adjustments to one or more of the corresponding current reference signals $X_1$, $X_2$ and $X_3$.

As discussed above, in one embodiment, an optional communication channel 30 couples the UPS 100 with one or more smart grid power distributors 20. The communication channel 30 may include, for example, a wide area network (e.g., the Internet) and/or a local area network for exchanging messages and data between the UPS 100 and the smart grid distributor(s) 20. In another embodiment, the smart grid messages can be communicated through the power lines. As described below, the communication channel 30 can be used by the UPS 100 to, among other things, receive requests to reduce the load on one or more phases of the input power 12, and/or to send acknowledgements of the requests, denials of the requests, status updates, and other information to the smart grid distributor 20. Some non-limiting examples of information the UPS 100 may receive from the smart grid 20 over the communication network 30 include:

Request for the UPS to reduce the load on phase [phase number] [by amount].

Request for the UPS to reduce the load on phase [phase number] at [date/time] [for minutes/hours].

Request for the UPS to provide load and/or capacity information.

Some non-limiting examples of information the UPS 100 may send to the smart grid 20 over the communication network 30 include:

The UPS acknowledges the request (from the smart grid) to reduce the load on one phase.

The UPS denies the request (from the smart grid) to reduce the load on one phase.

The UPS is operating with [amount of] spare capacity and is able to reduce the load on one phase.

The UPS is operating with no spare capacity and is not able to reduce the load on any phase.

The UPS will have [amount of] spare capacity and will be able to reduce the load on one phase at [date/time] for [minutes/hours].

The UPS is operating at reduced load [amount] on phase [phase number].

The UPS is operating at reduced load [amount] on phase [phase number] but will need to increase the load on phase [phase number] at [date/time].

Figure 3:
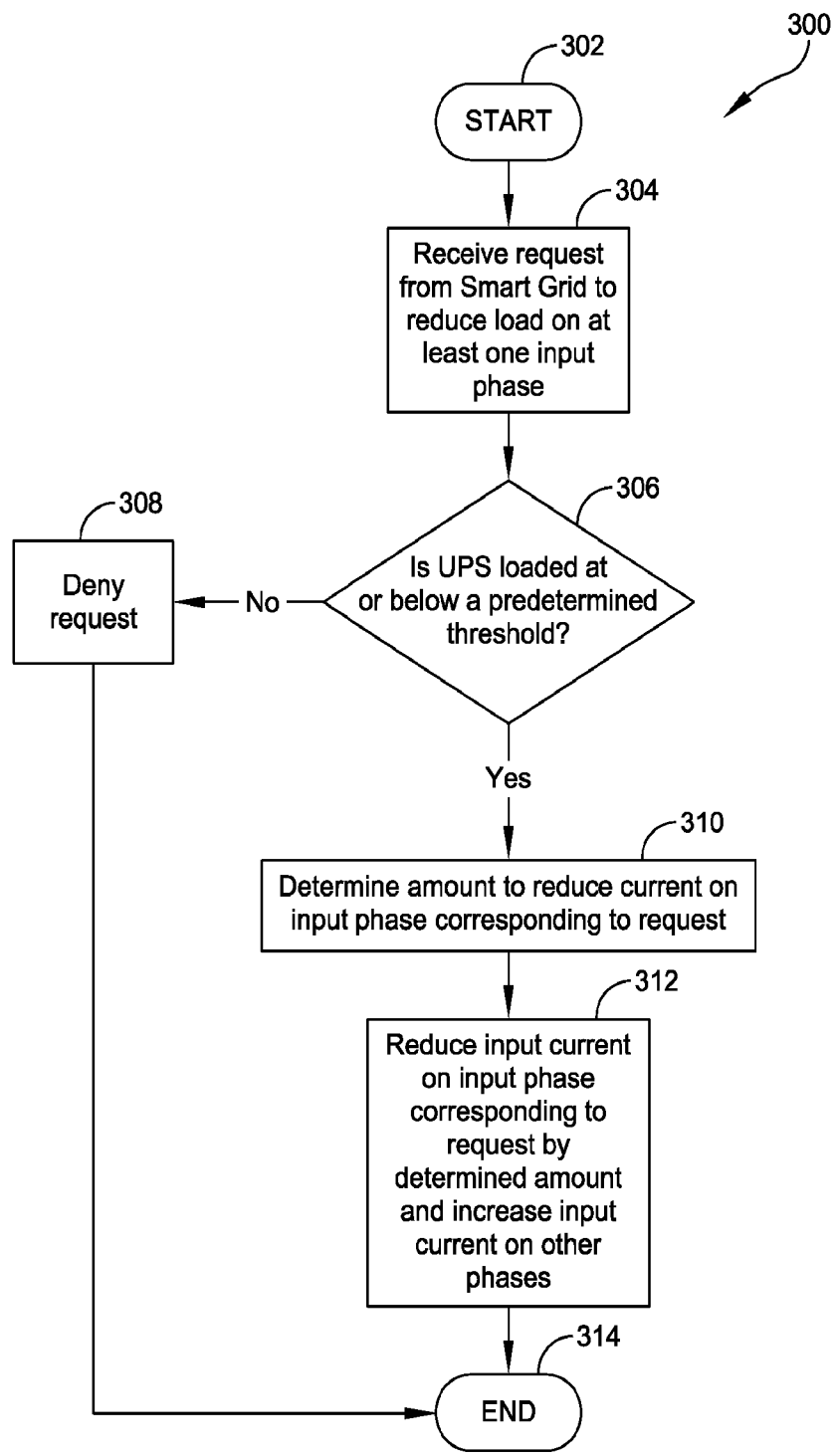
FIG. 3 is a flow diagram of a process for controlling an uninterruptible power supply in accordance with one embodiment of the present invention.

According to some embodiments, the UPS 100 can reduce the load on one or more phases of the polyphase power input 10 either in response to a remote request (e.g., a request from the smart grid distributor 30 of FIG. 1) or in response to a local determination to proactively reduce the load without receiving a remote request. FIG. 3 is a flow diagram of one process 300 for controlling the UPS 100, according to one embodiment, in which the UPS 100 determines whether to reduce the load on one phase of the polyphase power input 10 in response to a remote request, e.g., a request from the smart grid distributor 30.

The process 300 begins at block 302. At block 304, the UPS 100 receives a request from a smart grid, such at the smart grid 20 of FIG. 1, to reduce a load on at least one phase of the polyphase power input 10. For example, the request may be received over the communication channel 30 of FIG. 1. The request may include information specifying which phase of the polyphase power input 10 the request pertains to, such as a request for the UPS 100 to reduce the load on phase L1 (320), L2 (322) or L3 (324), in the case of three-phase power. The request may further include information such as an amount to reduce the load (e.g., "reduce the load on L2 by 10%"), a time to begin and/or end load reduction, or other information related to the request.

At block 306, subsequent to receiving the request, the UPS 100 determines a ratio of the total load of the UPS to the total rated load of the UPS. The total rated load of a UPS is generally expressed in terms of the maximum apparent power in volt-amperes (VA), although some UPS units may have load ratings expressed in watts. For example, a UPS may have a total rated load of 100,000 VA (100 kVA), in which the total load may not exceed 100 kVA. A predetermined threshold level (e.g., a percentage of the total load to the total rated load) can be used for comparing the ratio between the total load on the UPS 100 at a given point in time and the total rated load. Thus, at block 306, if the total load is not less than or equal to the predetermined threshold level (e.g., approximately 66%), then the request is denied at block 308, and the process 300 proceeds to end at block 314. Otherwise, the process 300 continues at block 310. Optionally, if the request is denied, a message indicating the denial of the request may be sent to the smart grid, for example, using the communication channel 30.

At block 310, if the total load is less than or equal to the predetermined threshold, then the UPS determines an amount to reduce the current drawn on the requested phase of the polyphase power input 10 to accommodate the request. The determination may be based, at least in part, on the total load of the UPS 100 at a given point in time, an average or peak load over a period of time (e.g., over the previous several hours), and/or a predicted total load in the future (e.g., based on trending, scheduling, or other similar factors). For instance, if the load can be completely supported on two phases, the UPS 100 may reduce the current drawn from the third phase to zero. The determination may optionally be based, at least in part, on load balancing calculations using techniques known to one of skill in the art.

At block 312, the input current on the input phase corresponding to the request from the smart grid is reduced by the amount determined in block 310, and the input current on one or more of the other input phases is increased. For example, the input current may be reduced by reducing the corresponding current reference generated by the current controller 140 of FIG. 1. In one embodiment, the input current is reduced for a period of time that may be predetermined (e.g., two hours), or reduced until a yet-to-be-determined later point in time. For example, the UPS 100 may reduce the load on one phase until the load demands additional power, at which time the amount of current drawn on the reduced load phase is increased as necessary to accommodate the demand. In another example, the UPS 100 may reduce the load until the smart grid indicates (e.g., with a message over the communication channel) that the reduced load is no longer needed. Process 300 ends at block 314.

Figure 4:
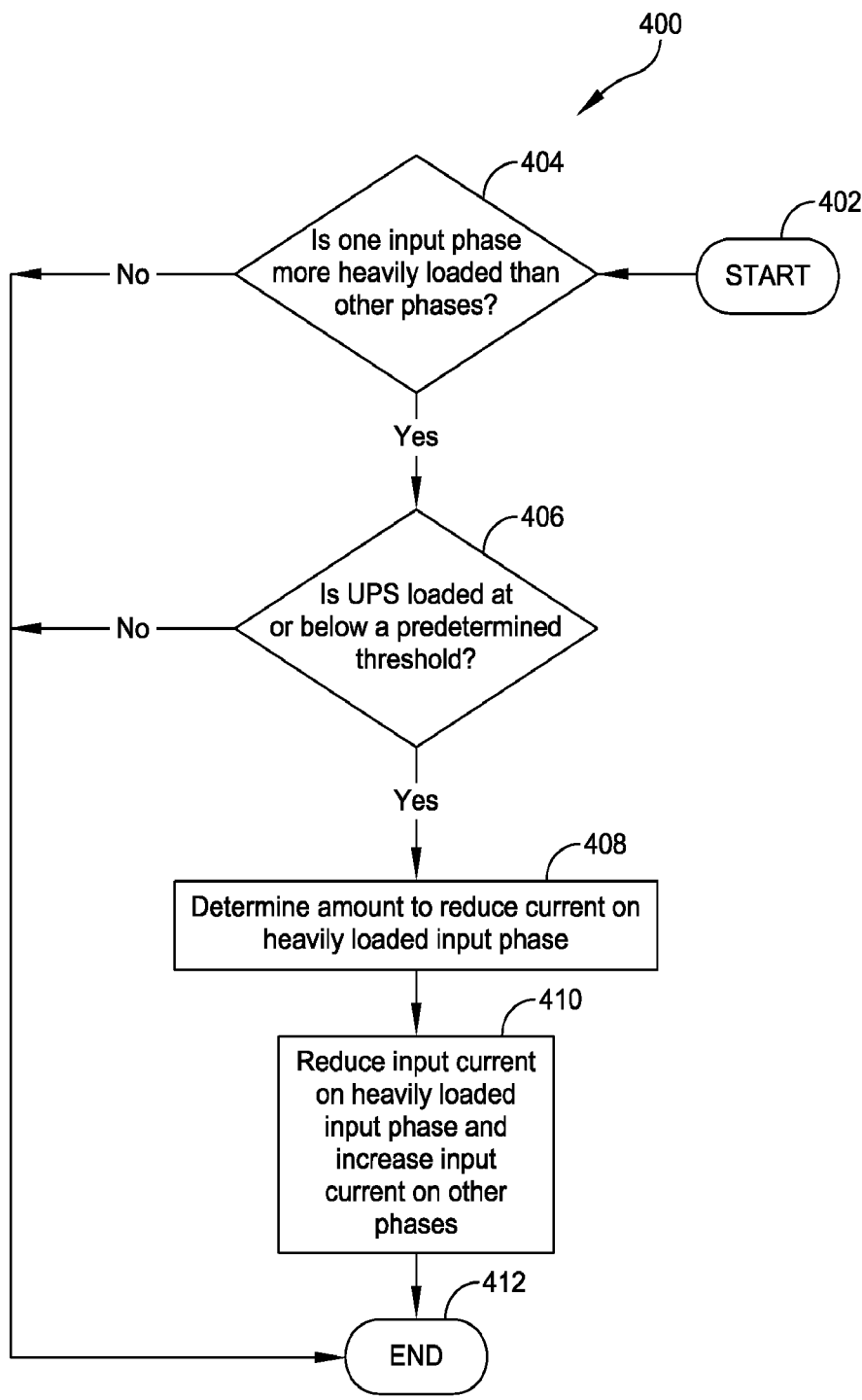
FIG. 4 is a flow diagram of a process for controlling an uninterruptible power supply in accordance with another embodiment of the present invention.

As mentioned above, in one embodiment, the UPS 100 can reduce the load on one or more phases of the polyphase power input 10 in response to a local determination to proactively reduce the load, for example, on a weak or overloaded phase or where an electrical unbalance exists. An electrical unbalance can be caused by low voltage on one phase or other electricity distribution problems. FIG. 4 is a flow diagram of one process 400 for controlling the UPS 100, according to one embodiment, in which the UPS 100 determines whether to reduce the load on one phase of the polyphase power input 12 in response to a local determination to reduce the load. The process 400 begins at block 402. At block 404, the UPS 100 determines whether one phase of the polyphase power input 12 is more heavily loaded than at least one other phase. Such a determination can be made, for example, by measuring and comparing the loads on each phase of the polyphase power input 12 with one another, or by detecting a low voltage on one phase of the polyphase power input 12. If one phase is not more heavily loaded than at least one other phase, or if the voltage is not low, then process 400 ends at block 412. Otherwise, process 400 continues to block 406.

At block 406, subsequent to determining that one phase is more heavily loaded than at least one other phase, the UPS 100 determines a ratio of the total load of the UPS to the total rated load of the UPS 100, such as described above with respect to FIG. 3. If the total load is not less than a predetermined threshold level (e.g., approximately 66%), then the process 400 proceeds to end at block 412. Otherwise, the process 400 continues at block 408.

At block 408, if the ratio of the total load to the total rated load is less than the predetermined threshold, then the UPS determines an amount to reduce the current drawn on the requested phase of the polyphase power input 10 to accommodate the request. The determination may be based, at least in part, on the current load of the UPS 100. For example, if the load can be completely supported on two phases, the UPS 100 may reduce the current drawn from the third phase to zero. The determination may optionally be based, at least in part, on load balancing calculations using techniques known to one of skill in the art.

At block 410, the input current on the input phase corresponding to the request from the smart grid is reduced by the amount determined in block 408, and the input current on one or more of the other input phases is increased. For example, the input current may be reduced by reducing the corresponding current reference generated by the current controller 140 of FIG. 1. In one embodiment, the input current is reduced for a period of time that may be predetermined (e.g., two hours) or determined at a later point. For example, the UPS 100 may reduce the load on one phase until the load demands additional power, at which time the amount of current drawn on the reduced load phase is increased as necessary to accommodate the demand. In another example, the UPS 100 may reduce the load until the smart grid indicates (e.g., with a message over the communication channel) that the reduced load is no longer needed. Process 400 ends at block 412.

In accordance with one or more of the above-described embodiments, the inventor has realized that while the UPS 100 has spare capacity (e.g., it is loaded by no more than approximately 66% of the total rated power output of the UPS 100), it is possible to simultaneously draw unequal currents from each of the polyphase power inputs 12 to reduce the load on at least one phase by reducing the current reference associated with the phase for which a reduced load is desired. Further, by increasing the current reference signals for other phases, the total output power of the UPS 100 can remain substantially unchanged. Accordingly, such embodiments can provide a valuable service to the power grid (e.g., by reducing the load on an overburdened phase) without any drawbacks or risks to the user of the UPS 100 or the load 106. This may assist the power grid achieve balance, reduce undesirable losses, and maintain higher up-time. Further, in accordance with some embodiments, the above advantages can be achieved without loading the battery 104 or reducing the reserve capacity or run time of the battery during backup mode of operation.

Any of the preceding embodiments can be implemented within a UPS, for example, a UPS having a DC battery as a backup power source. The UPS may be configured to provide backup power for any number of power consuming devices, such as computers, servers, network routers, air conditioning units, lighting, security systems, or other devices and systems requiring uninterrupted power. The UPS may contain, or be coupled to, a controller or control unit to control the operation of the UPS. For example, the controller may provide pulse width modulated (PWM) signals to each of the switching devices within the circuit for controlling the power conversion functions. In another example, the controller may provide control signals for the relays. In general, the controller controls the operation of the UPS such that it charges the battery from the AC power source when power is available from the AC power source, and inverts DC power from the battery when the AC power source is unavailable or during brown-out conditions. The controller can include hardware, software, firmware, a processor, a memory, an input/output interface, a data bus, and/or other elements in any combination that may be used to perform the respective functions of the controller.

In the embodiments described above, a battery is used as a backup power source. In other embodiments, other AC or DC backup sources and devices may be used including fuel cells, photovoltaics, DC micro turbines, capacitors, an alternative AC power source, any other suitable power sources, or any combination thereof. In embodiments of the invention that utilize a battery as a backup power source, the battery may be comprised of multiple batteries of cells coupled in parallel or in series.

In one or more of the preceding embodiments, the switching devices may be any electronic or electromechanical device that conducts current in a controlled manner (e.g., by using a control signal) and can isolate a conductive path. Representations of various switching devices, and other electronic devices, in the figures are exemplary and not intended to be limiting, as it will be appreciated by one skilled in the art that similar or identical functionality may be obtained using various types, arrangements, and configurations of devices. For example, one or more of the switching devices may contain one or more anti-parallel diodes, or such diodes may be separate from the switching devices. As indicated above, in some embodiments, the switching devices include a rectifier, for example, a controlled rectifier that can be turned on and off with the application of a control signal (e.g., an SCR, a thyristor, etc.). Additionally, other devices, such as resistors, capacitors, inductors, batteries, power supplies, loads, transformers, relays, diodes, and the like may be included in a single device, or in a plurality of connected devices.

In the embodiments described above, rectifier/boost circuits are described for use with uninterruptible power supplies, although it should be appreciated that the circuits described herein may be used with other types of power supplies.

Embodiments of the present invention may be used with uninterruptible power sources having a variety of input and output voltages and may be used in single phase or multi-phase uninterruptible power supplies. The UPS, in one embodiment, can be a conventional double conversion UPS in which the firmware and/or software is modified to generate unequal current reference signals.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. For example, the gating pulses used to operate the switching devices of the power converter may vary in frequency, duty cycle, or both. Further, alternative configurations of electrical components may be utilized to produce similar functionality, for example, inverter and charger functions, or other functions. Accordingly, the foregoing description and drawings are by way of example only.

What is claimed is:

1. A method for controlling an uninterruptible power supply (UPS) having a polyphase power input and an input power circuit coupled to the polyphase power input, the method comprising acts of:
   determining to reduce a load on a first phase of the polyphase power input; and
   in response thereto, controlling the input power circuit to reduce a first input current drawn from the first phase by a first amount and increase at least one second input current drawn from at least one second phase of the polyphase power input by a second amount such that the first input current drawn from the first phase of the polyphase power input is not equal to the second input current drawn from the at least one second phase of the polyphase power input.

2. The method of claim 1, further comprising an act of calculating the first amount to reduce the first input current and the second amount to increase the at least one second input current such that a total output current of the UPS remains substantially constant as the first input current is reduced.

3. The method of claim 2, wherein the input power circuit is configured to drive the first input current toward a first current reference value and drive the at least one second input current toward at least one second current reference value, and wherein the method further comprises an act of generating the first current reference value configured to reduce the first input current by the first amount and the at least one second current reference value configured to increase the at least one second input current by the second amount.

4. The method of claim 3, wherein the act of generating includes generating the first current reference value and the at least one second current reference value such that each is substantially sinusoidal and in-phase with the first phase of the polyphase power input and the at least one second phase of the polyphase power input, respectively.

5. The method of claim 1, wherein the UPS has a communication interface configured to receive a message from a smart grid including a request to reduce the load on the first phase, wherein the method further comprises an act of receiving the message using the communication interface, and wherein the act of determining is performed in response to receiving the request.

6. The method of claim 5, wherein the message is a first message, wherein the communication interface is further configured to send a second message including an acceptance of the request to the smart grid, and wherein the method further comprises an act of sending the second message using the smart grid message interface in response to determining to reduce the load on the first phase of the polyphase power input.

7. The method of claim 1, wherein the UPS has a total rated output power, wherein the input power circuit is further configured to provide a total demanded output power to a load of the UPS, wherein the method further comprises an act of comparing the total demanded output power to the total rated output power, and wherein the act of determining includes determining to reduce the load on the first phase when the total demanded output power is less than a predetermined amount of the total rated output power.

8. The method of claim 1, wherein the load on the first phase is a first load, wherein the method further comprises an act of detecting that the first load is greater than at least one second load on the at least one second phase, and wherein the act of determining includes determining to reduce the first load in response to detecting that the first load is greater than the at least one second load by a predetermined amount.

9. An uninterruptible power supply (UPS), comprising:
a polyphase power input having a first phase and a second phase;
an input power circuit coupled to the polyphase power input and configured to draw a first input current on the first phase and draw a second current on the second phase; and
a control unit coupled to the input power circuit and configured to:
determine to reduce a load on the first phase; and
in response thereto, control the input power circuit to reduce the first input current and increase the second input current such that the first input current drawn from the first phase of the polyphase power input is not equal to the second input current drawn from the second phase of the polyphase power input.

10. The UPS of claim 9, wherein the control unit is further configured to calculate the first amount to reduce the first input current and the second amount to increase the second input current such that a total output current of the UPS remains substantially unchanged as the first input current is reduced.

11. The UPS of claim 10, wherein the input power circuit is configured to drive the first input current toward a first current reference value and drive the second input current toward a second current reference value, and wherein the control unit is further configured to generate the first current reference value configured to reduce the first input current by the first amount and the second current reference value configured to increase the second input current by the second amount.

12. The UPS of claim 11, wherein the control unit is further configured to generate the first current reference value and the second current reference value such that each is substantially sinusoidal and in-phase with the first phase of the polyphase power input and the second phase of the polyphase power input, respectively.

13. The UPS of claim 9, further comprising a communication interface coupled to the control unit and configured to receive a message from a smart grid including a request to reduce the load on the first phase, wherein the control unit is further configured to receive the message using the communication interface and determine to reduce the load on the first phase in response to receiving the request.

14. The UPS of claim 13, further comprising an input rectifying stage coupled to the polyphase power input and configured to adjust each of a first RMS current drawn from the first phase and a second RMS current drawn from the second phase to be similar or dissimilar in response to receiving the request in the message.

15. The UPS of claim 14, wherein a total average power drawn from the first phase and the second phase is substantially the same subsequent to adjusting the first RMS current and the second RMS current as prior to adjusting the first RMS current and the second RMS current.

16. The UPS of claim 9, wherein the UPS has a total rated output power, wherein the input power circuit is further configured to provide a total demanded output power to a load of the UPS, wherein the control unit is further configured to compare the total demanded output power to the total rated output power and determine to reduce the load on the first phase when the total demanded output power is less than a predetermined amount of the total rated output power.

17. The UPS of claim 9, wherein the load on the first phase is a first load, and wherein the control unit is further configured to detect that the first load is greater than a second load on the second phase and determine to reduce the first load in response to detecting that the first load is greater than the second load by a predetermined amount.

18. An uninterruptible power supply (UPS), comprising:
a polyphase power input having a first phase and a second phase;
a rectifier circuit coupled to the polyphase power input and configured to draw a first input current on the first phase and draw a second current on the second phase; and
means coupled to the rectifier circuit for determining to reduce a load on the first phase, and, in response thereto, controlling the rectifier circuit to reduce the first input current drawn or increase the second input current drawn such that the first input current drawn from the first phase of the polyphase power input is not equal to the second input current drawn from the second phase of the polyphase power input.

19. The UPS of claim 18, wherein the UPS is configured to provide an output power, and wherein the UPS further comprises means for maintaining the output power at a substantially unchanged level as the load on the first phase is reduced.

20. The UPS of claim 19, further comprising a communication interface configured to receive a message from a smart grid including a request to reduce the load on the first phase, wherein the means is coupled to the communication interface and is configured determine to reduce the load on the first phase in response to receiving the request in the message.

* * * * *